Sept. 2, 1924.  1,507,336
C. L. COOLING ET AL
ELECTRICALLY HEATED BEDPAN
Filed July 27, 1923
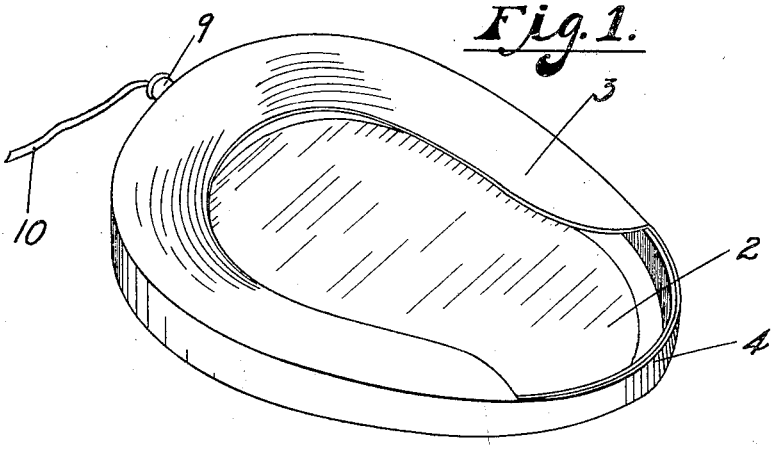
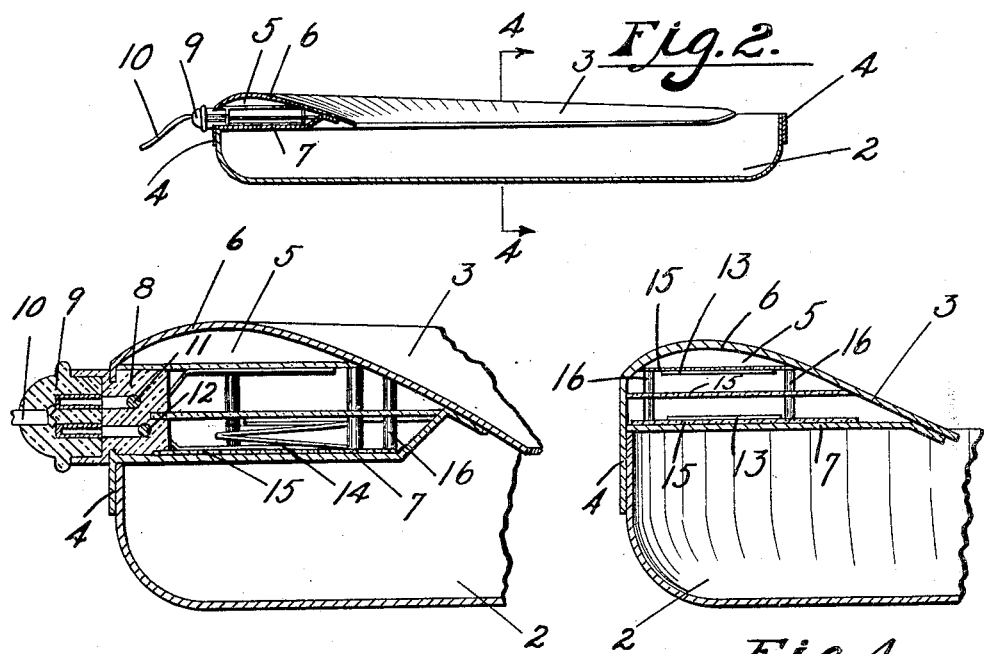
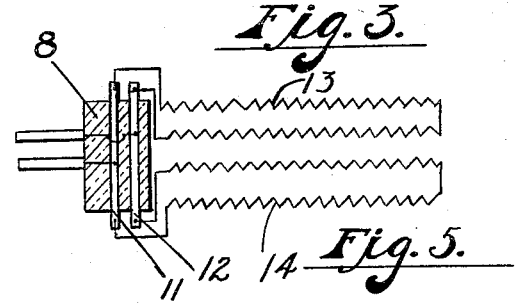
INVENTORS
Christopher L. Cooling.
Harry G. Ostermann.
Hazard and Miller
by
ATT'YS.

Patented Sept. 2, 1924.

1,507,336

UNITED STATES PATENT OFFICE.

CHRISTOPHER L. COOLING, OF SANTA MONICA, AND HARRY G. OSTERMANN, OF LOS ANGELES, CALIFORNIA.

ELECTRICALLY-HEATED BEDPAN.

Application filed July 27, 1923. Serial No. 654,134.

*To all whom it may concern:*

Be it known that we, CHRISTOPHER L. COOLING, a subject of the King of Great Britain, and HARRY G. OSTERMANN, a citizen of the United States, residing at Santa Monica and Los Angeles, respectively, in the county of Los Angeles and State of California, have invented new and useful Improvements in Electrically-Heated Bedpans, of which the following is a specification.

This invention relates to improvements on bed pans used in hospitals and sick-rooms.

An object of our invention is to provide a bed pan which will not cause shock when inserted beneath the patient. Another object is to provide a bed pan which is warmed by means of a simple but effective heating element.

With these and other objects in view our invention consists of the features of construction and combination and arrangement of parts, hereinafter more fully described and claimed, reference being made to the accompanying drawing, in which—

Fig. 1 is a view in perspective of our improved bed pan.

Fig. 2 is a vertical section taken longitudinally through the bed pan.

Fig. 3 is a detailed section.

Fig. 4 is a cross section taken on the line 4—4 of Fig. 2.

Fig. 5 is a diagram of the electric circuit through the heating element of the bed pan.

Referring to the drawing in which similar reference characters denote similar parts, our invention consists of a cover 3 provided with a telescopic rim 4 fitting over a straight upwardly projecting rim of a pan 2. The cover 3 is provided with a hollow compartment 5 formed by the plates 6 and 7, forming the top and bottom of the cover.

Suitable electric heating elements are connected to a source of current through a socket block 8 carrying a removable plug 9 connecting with a lamp cord 10.

As is clearly shown in Fig. 5, the heating element consists of two separate circuits 13 and 14 connected in parallel by means of rods 11 and 12 mounted within the socket block 8. It will be understood that each of the aforementioned circuits heats but one half of the pan. Suitable insulation for the heating element is provided by strips 15 of mica or similar insulative material which are held in position by means of pins 16.

It may be seen that the cover 3 may be removed for cleaning purposes, and that the hollow compartment 5, enclosing the heating element, is water-tight.

It is understood that various changes in the details of construction may be made without departing from the spirit of our invention, and that its application is not necessarily confined to bed pans but may apply equally as well to toilet seats, or any other seat of similar nature.

Further embodiments, modifications and variations may be resorted to within the spirit of the invention.

What we claim is:

The combination with a bed pan having a straight upwardly projecting rim, of a telescopic rim fitting the upwardly projecting rim, means upon the telescopic rim forming a hollow compartment, the top of the compartment being extended to form a partial cover for the pan, and an electric heating element in the compartment.

In testimony whereof we have signed our names to this specification.

CHRISTOPHER L. COOLING.
HARRY G. OSTERMANN.